(12) United States Patent
van Dijk et al.

(10) Patent No.: US 8,683,563 B1
(45) Date of Patent: Mar. 25, 2014

(54) SOFT TOKEN POSTURE ASSESSMENT

(75) Inventors: Marten van Dijk, Somerville, MA (US); Kevin D. Bowers, Melrose, MA (US); Samuel Curry, Andover, MA (US); Sean P. Doyle, Edmonds, WA (US); William M. Duane, Westford, MA (US); Ari Juels, Brookline, MA (US); Michael J. O'Malley, Lowell, MA (US); Nikolaos Triandopoulos, Arlington, MA (US); Riaz Zolfonoon, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 6 days.

(21) Appl. No.: 13/435,616

(22) Filed: Mar. 30, 2012

(51) Int. Cl.
*G06F 7/04* (2006.01)

(52) U.S. Cl.
USPC .............................................................. 726/6

(58) Field of Classification Search
USPC ................................................. 726/6, 22–26
See application file for complete search history.

(56) References Cited

U.S. PATENT DOCUMENTS

| | | | |
|---|---|---|---|
| 2009/0205036 A1* | 8/2009 | Slaton et al. | 726/9 |
| 2012/0129503 A1* | 5/2012 | Lindeman et al. | 455/414.1 |
| 2012/0260093 A1 | 10/2012 | Benson et al. | |
| 2012/0297456 A1* | 11/2012 | Rose et al. | 726/4 |
| 2013/0311322 A1 | 12/2012 | Koyun et al. | |
| 2013/0097660 A1* | 4/2013 | Das et al. | 726/1 |

FOREIGN PATENT DOCUMENTS

WO 2009/001020 A1 12/2008

OTHER PUBLICATIONS

Juels et al., "Key Update With Compromise Detection," U.S. Appl. No. 13/250,225, filed Sep. 30, 2011.
O'Malley et al., "Device Bound OTP Generation," U.S. Appl. No. 12/827,045, filed Jun. 30, 2010.

* cited by examiner

*Primary Examiner* — Brandon Hoffman
*Assistant Examiner* — Anthony Brown
(74) *Attorney, Agent, or Firm* — BainwoodHuang

(57) ABSTRACT

An improved technique for assessing the security status of a device on which a soft token is run collects device posture information from the device running the soft token and initiates transmission of the device posture information to a server to be used in assessing whether the device has been subjected to malicious activity. The device posture information may relate to the software status, hardware status, and/or environmental context of the device. In some examples, the device posture information is transmitted to the server directly. In other examples, the device posture information is transmitted to the server via auxiliary bits embedded in passcodes displayed to the user, which the user may read and transfer to the server as part of authentication requests. The server may apply the device posture information in a number of areas, including, for example, authentication management, risk assessment, and/or security analytics.

20 Claims, 5 Drawing Sheets

SOFT TOKEN POSTURE ASSESSMENT

BACKGROUND

Computer networks, such as those available at a workplace, university, or other organization, are often configured to provide remote access to users through virtual private networks (VPNs), customized network settings, and/or other technologies. Users must typically authenticate to remote networks before being granted access. Authentication may involve users providing various authentication factors, such as user IDs, passwords, token codes, and personal identification numbers (PINs). In a typical scenario, a user submits an authentication request containing one or more authentication factors to an authentication server. The authentication server receives the request and either grants or denies network access to the user based on whether the authentication factors submitted match expected values.

A common authentication scheme involves the use of token codes. Token codes, also known as one-time passwords, or "OTPs," are generated automatically, such as by portable devices (i.e., "hard tokens"), which may be distributed to users. An example of a hard token is the SecureID® token code generator, which is available from RSA Security Inc., of Bedford, Mass. Recently, software has been developed to perform the functions of hard tokens on smart mobile devices, such as smart phones, PDAs, and tablets. Like hard tokens, these "soft tokens" generate token codes at regular intervals. Token codes generated by a soft token are displayed on a display screen of a user's smart mobile device. A token code is entered manually by the user into a login screen presented on the user's computer, which then forwards the token code, along with any additional authentication information, to the authentication server, which either grants or denies access to the user.

To enhance security, various adaptive authentication schemes have been developed. These adaptive authentication schemes collect machine-specific and user-specific information from a user's computer and provide the information to the authentication server along with other authentication factors (e.g., token codes). The authentication server then applies the information it receives about the user's computer in granting or denying access to the user.

SUMMARY

Hard tokens are generally provided as single function, output-only devices, with only one means for communicating, i.e., a display for providing token codes to users. In contrast with hard tokens, soft tokens are generally installed and run on relatively complex, multi-function devices. These devices generally support multiple communication media, such as Wi-Fi, Blue-tooth, cell phone, infrared, and cabled connections to one or more computers. The devices may run a plethora of software (e.g., "apps"), and may support various communication formats, such as file transfer, email, instant messaging, cell phone data exchange, video chat, and other forms of communication. Providing the functions of a hard token on a user device like a smart phone promotes user convenience, as the user does not have to carry multiple devices. Unfortunately, however, the use of soft tokens on mobile devices also subjects the soft tokens to security vulnerabilities and malicious attacks.

For example, fraudsters can attempt to embed viruses or scripts in a wide variety of files or data streams. The viruses or scripts may attack the soft token running on the user's device as part of an effort to copy, alter, or use the soft token for the fraudster's own purposes. Fraudsters can also attempt to physically alter the hardware of the user's device to circumvent security measures. As malicious users become more innovative, they continue to attempt new ways of breaking into soft tokens.

Numerous adaptive authentication techniques have been developed to detect fraudulent activity that takes place on a user's computer. These measures have limited utility, however, when it is the user's smart mobile device, rather than the user's computer, which is the subject of attack.

In contrast with these prior techniques, which focus on collecting data about the user's computer, an improved technique collects device posture information about the device running the soft token. The improved technique collects the device posture information and initiates transmission of the information to a server to be used in assessing whether the device running the soft token has been subjected to malicious activity. In some examples, the posture information is transmitted from the device to the server using an electronic communication medium supported by the device. In other examples, transmission of the posture information, or portions thereof, is initiated by blending different sequences of collected posture information with respective token codes generated by the soft token, and presenting the blended results to the user in the form of passcodes. The user may then manually copy a passcode into a field displayed on the user's computing machine and submit the entered passcode as part of an authentication request to the server. In some examples, the server extracts the token code and the transmitted portion of device posture information. The server uses the token code for authentication, and uses the devices posture information for any number of operations, which may include but are not limited to user authentication.

In certain embodiments, a method of assessing the security status of a device on which a soft token is run includes collecting device posture information by the device pertaining to at least one of the device's software status, hardware status, or environmental context. The device posture information provides an indication of whether the device has been subjected to malicious activity. The method further includes generating token codes by the soft token on the device for enabling a user of the device to authenticate to a server, and initiating transmission of the collected device posture information from the device to the server.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

An improved technique for assessing the security status of a device on which a soft token is run collects device posture information from the device running the soft token and initiates transmission of the device posture information to a server to be used in assessing whether the device has been subjected to malicious activity. The device posture information may relate to the software status, hardware status, and/or environmental context of the device. The server may apply the device posture information in a number of areas, including, for example, authentication management, risk assessment, and/or security analytics.

Figure 1:
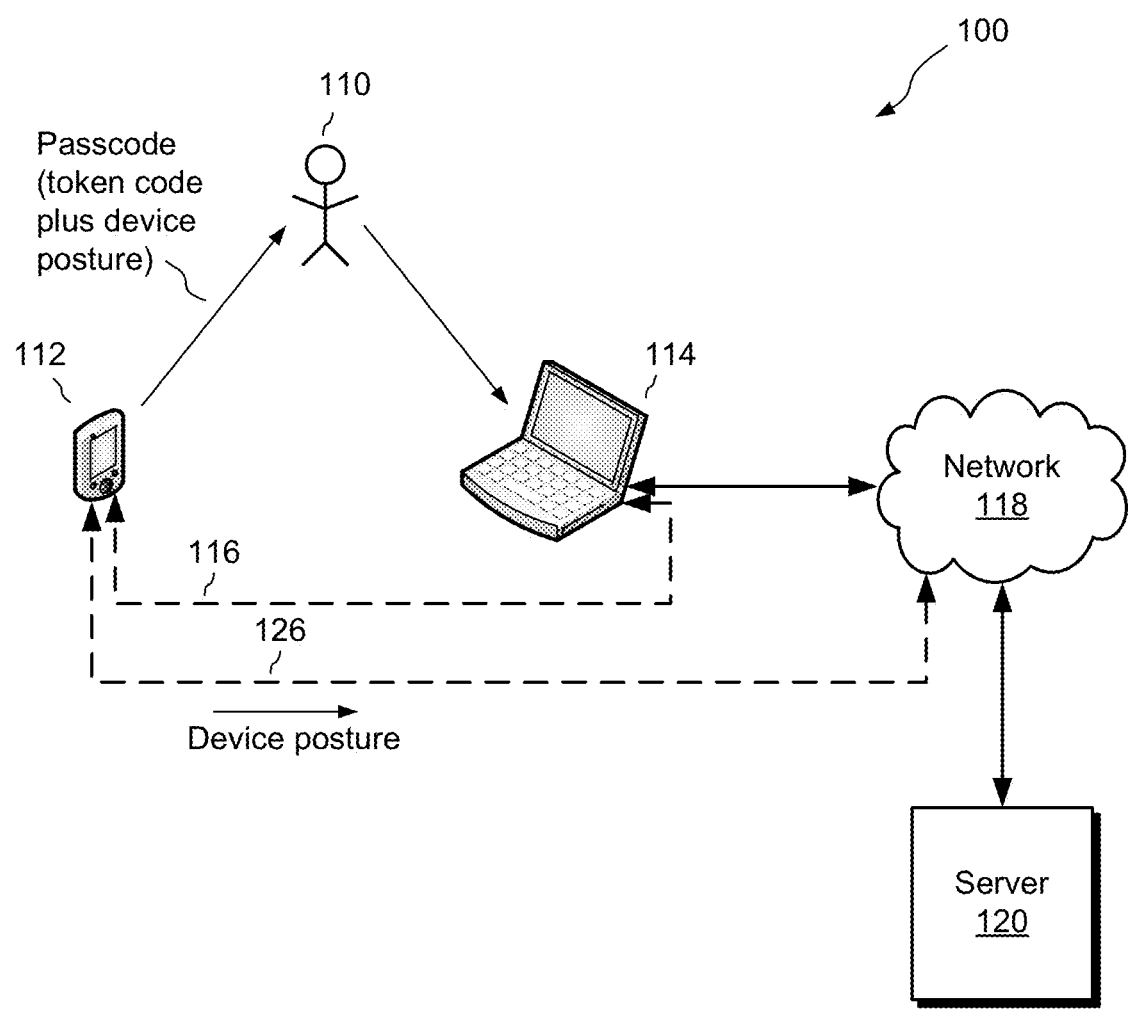
FIG. 1 is simplified schematic diagram of an example environment in which a device used for generating token codes for authenticating a user to a server is configured to transmit device posture information to the server.

FIG. 1 shows an example environment 100 in which device posture information may be collected and transferred to a server in accordance with the improvements hereof. As shown, a user 110 has access to a device 112 and a computing machine 114. The computing machine 114 is connected to a server 120 via a network 118. A communication medium 116, such as a cable or wireless connection, is provided to allow the mobile device 112 to communicate with the computing machine 114. In addition, a communication medium 126 is provided to allow communication between the device 112 and the server 120. In some examples, the communication medium 126 is a wireless medium, such a cell phone network or Wi-Fi network, for example.

The device 112 includes a soft token, which generates token codes on a regular basis, such as once per minute. Within the device 112, device posture information is collected and stored. In some examples, the collected device posture information is transmitted to the server 120 via the communication medium 126. In other examples, system posture information is partitioned into portions, and the portions are blended with respective token codes from the soft token to generate passcodes, which the device 112 displays to the user 110. The user 110 may read passcodes and manually copy them into a field displayed on the computing machine 114. Optionally, the user 110 may enter additional information, such as a user ID, Personal Identification Number (PIN), and/or other authentication factors. The user 110 may then submit an authentication request to the server 120 using the passcode and, if provided, other authentication factors.

The server 120, upon receiving the authentication request from the computing machine 114, extracts the submitted token code and the portion of device posture information from the passcode. The server may then apply the token code in authenticating the user, and may apply the device posture information in any of a variety of operations, which may include but are not necessarily limited to authenticating the user 110.

It is understood that the device 112 can be any hand-held or portable device, including, for example, a smart phone, PDA, tablet computer, or portable computer (e.g., a laptop). In some examples, the device 112 is implemented as a virtual machine. The computing machine 114 can also be any type of computing machine, such as a laptop computer, desktop computer, server, virtual machine, tablet, smart phone or PDA. Further, the network 118 may include a Local Area Network (LAN), a Wide Area Network (WAN), a cellular phone network, a virtual network, the Internet, some other network, or any combination of the foregoing, for example. The server 120 is typically an authentication server, or another server that has access to an authentication server. It is understood that the server 120 may include one or more computers operating in coordination to provide users with access to a remote network, such as a corporate or other organizational network, for example.

Figure 2:
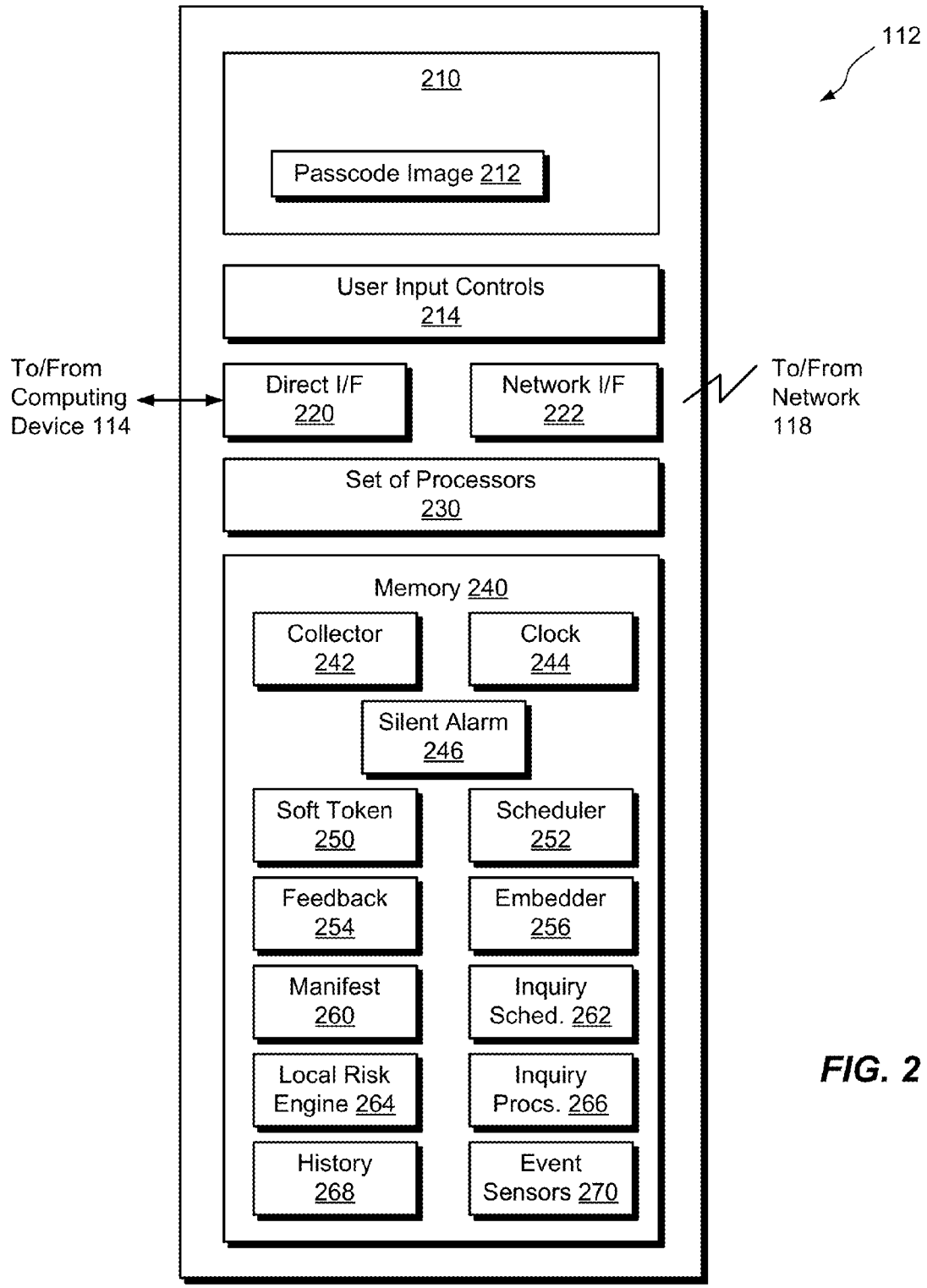
FIG. 2 is a block diagram of an example device of FIG. 1.

FIG. 2 shows an example device 112 in greater detail. The device 112 is seen to include a display 210 for displaying text and/or images to the user 110. These may include a passcode image 212, for displaying passcodes to the user 110. The device 112 also includes user input controls 214 (e.g., one or more buttons). A touchscreen may be provided in the user input controls 214 or integrated with the display 210. The device 112 also includes a direct interface 220, for connecting to the computing machine 114 using the communication medium 116, and a network interface 222, for connecting wirelessly to the network 118, e.g., using the communication medium 126.

The device 112 further includes a set of processors (i.e., one or more processing chips or assemblies) and memory 240. It is understood that the set of processors 230 and the memory 240 together form a specialized circuit that is constructed and arranged for performing various functions and processes as described herein.

The memory 240 includes numerous software constructs, such as an operating system and applications (e.g., "apps"). Software constructs relative to the improvements herein may include a collector 242, a clock 244, a silent alarm 246, a soft token 250, an auxiliary bit scheduler 252, a feedback processor 254, an embedder 256, a manifest 260, an inquiry scheduler 262, a local risk engine 264, various inquiry procedures 266, a device posture history 268, and various event sensors 270. These constructs will now be described in more detail with reference to FIG. 3.

Figure 3:
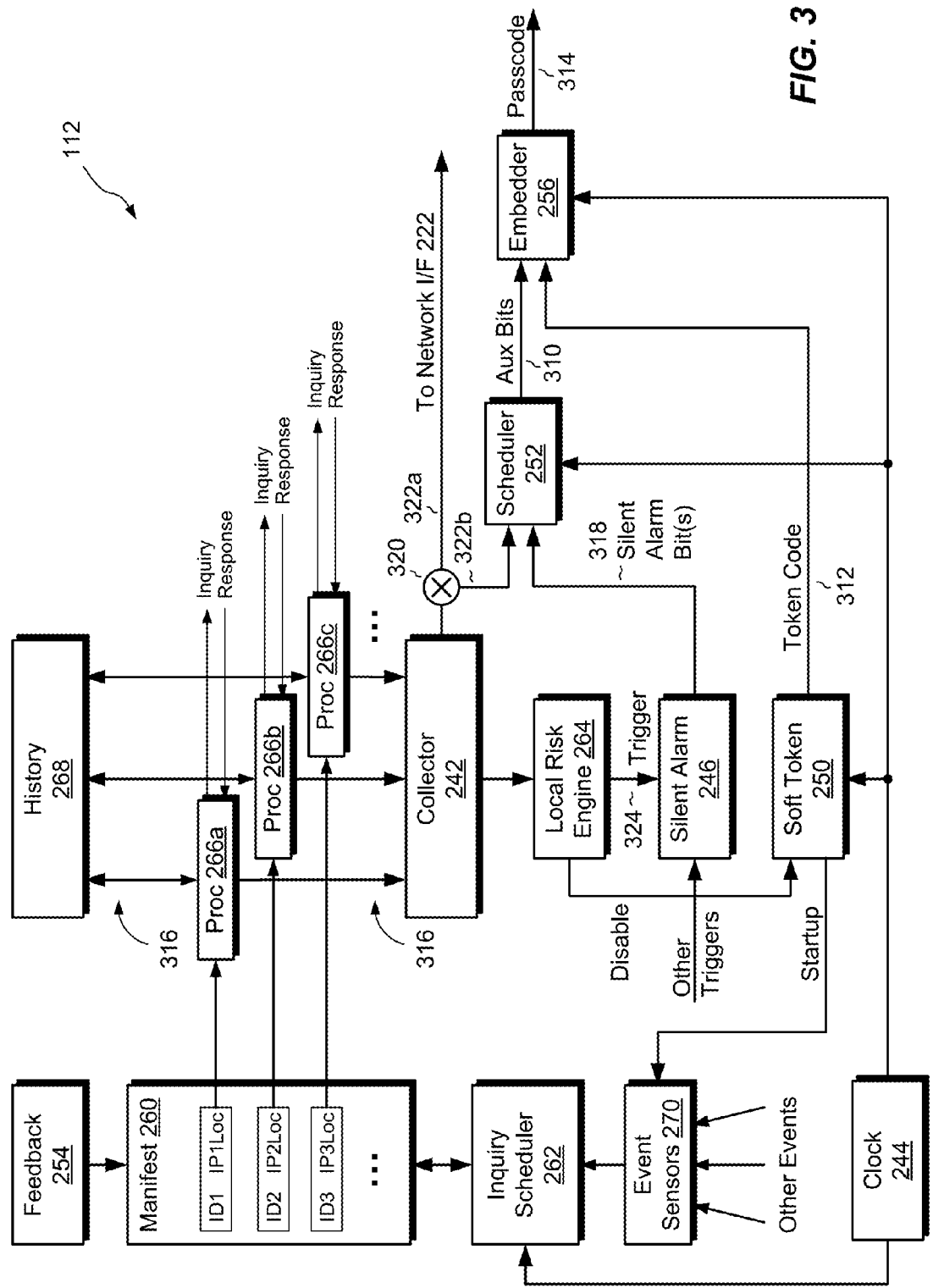
FIG. 3 is a more detailed block diagram of example portions of the device of FIG. 2.

FIG. 3 shows an example arrangement of certain software constructs of the device 112. It is seen, for example, that the device 112 includes a manifest 260. The manifest 260 stores a list of identifiers and locations (e.g., IDs ID1, ID2, etc., and locations IP1Loc, IP2Loc, etc.) of respective inquiry procedures 266 (e.g., procedures 266a, 266b, 266c, and so forth). Each inquiry procedure 266 includes one or more instructions for querying the device 112 and/or performing a test or diagnostic procedure for obtaining particular posture information about the hardware, software, and/or environment of the device 112. Results of the inquiry procedures 266 provide posture information 316 about the device 112, which is collected and stored in the collector 242. The posture information 316 may also be stored in the posture history 268, which stores current as well as past posture information 316 obtained by the inquiry procedures 266. The manifest 260 may be provided in any suitable form. In one example, the manifest 260 is an extended markup language (XML) file.

With posture information 316 collected, a selector 320 may be used to select one of two paths 322a and 322b for transmitting the posture information 316 from the collector 242 to the server 120. For example, by selecting the path 322a, the selector 320 may transmit the posture information 316 to the server 120 via the network 118 (e.g., directly, using a wireless communication protocol supported by the device 112). By selecting the path 322b, the selector 320 may route the posture information 316 to the server 120 via passcodes 314 prepared by the auxiliary bit scheduler 252 and embedder 256. The selection of a path by the selector 320 may be based on a number of factors, including, for example, whether the device 112 has a connection to the network 118, the volume of posture information to be transmitted, the priority of transmitting the posture information 316 quickly, and the sensitivity of the posture information 316, e.g., whether transmission of the posture information 316 in a direct fashion, such as over the Internet, could make secret information about the device 112 vulnerable to malicious eavesdroppers. In some examples, the selector 320 may provide posture information to both paths 322a and 322b simultaneously.

Transmission of posture information 316 to the server 120 via the path 322a may be conducted at any suitable time. In some examples, transmission of posture information 316 takes place when the user 110 submits an authentication request. The server 120, upon receiving the authentication request from the user 110, sends a message to the device 112 requesting posture information 316. The device 112 responds to the request by transmitting the collected posture information 316 to the server 120 via the network interface 222.

The auxiliary bit scheduler 252 operates by dividing the posture information 316 received over the path 322b into multiple portions, with each portion including a number of bits of the posture information 316 (e.g., 4 bits) that forms a sequence of auxiliary bits 310. The auxiliary bit scheduler 252 may produce a new sequence of auxiliary bits 310 each time the soft token 250 produces a new token code 312 (e.g., once per minute). The embedder 256 blends each generated sequence of auxiliary bits 310 with a respective token code 312, e.g., using a reversible blending operation, to create a respective passcode 314. The device 112 then displays the passcode 314 in the passcode image 212 on the display 210 of the device 112, for presentation to the user. The user may then read the passcode 314 and manually copy the passcode into a field of a login screen on the user's computing machine 114, whereupon the user may submit an authentication request to the server 120 using the passcode 314 (e.g., by entering other authentication information and clicking a button to submit the request). Since the passcode 314 includes a sequence of auxiliary bits 310, a communication channel is established whereby posture information 316 about the device 112 is transmitted to the server 120. In circumstances where the path 322a is selected (i.e., where auxiliary bits 310 are not to be used), the embedder 256 may be configured to pass through the token code 312 unchanged, such that the passcode 314 and the token code 312 are the same.

The server 120, upon receiving the passcode 314, may apply a reverse blending operation to the passcode 314 to extract the token code 312 and any sequence of auxiliary bits 310. The server 120 may then apply the token code 312 for authentication, and may apply the posture information 316 transmitted in any auxiliary bits 310 in any number of activities, which may include but are not necessarily limited to authentication.

Although only a small portion of posture information 316 is typically transmitted per login (e.g., 4 bits), a substantial quantity of information may be conveyed over time across multiple logins. In addition, the device 112 and the server 120 may coordinate to make communication more efficient. For example, the device 112 may be configured to send particular posture information 316 at particular times, with the server 120 expecting to receive that information at those times. For instance, the server 120 can communicate with the device 112 to request to MAC address of the device 112 between the hours of 6 PM and 9 PM. Although multiple logins will be required to transmit the MAC address, coordination between the device 112 and the server 120 helps to transmit the MAC address over a period of hours or days.

In some examples, the device 112 and the server 120 employ a mixed transmission scheme, with less vulnerable information transmitted directly to the server via the network 118 and more vulnerable information transmitted via auxiliary bits 310. The server thus takes advantage of fast communication provided by the direct path 322a and potentially more secure communication provided over the path 322b via passcodes 314.

Auxiliary bits 310 may be made additionally secure through the use of one or more silent alarm bits 318. As will be described more fully with reference to FIG. 4, the silent alarm bit(s) convey an alarm to the server 120 in response to the occurrence of a trigger event. Trigger events may include, for example, detection of tampering on the mobile device 112, detection of malware running on the mobile device 112, and/or detection of other suspect activities. In some examples, the auxiliary bit scheduler 252 includes a single silent alarm bit 318 with each generated sequence of auxiliary bits 310.

In certain examples, the device 112 employs a local risk engine 264. The local risk engine 264 monitors the device posture information 316 stored in the collector 242 and computes a risk score. For example, risk scores may range from zero to one hundred, with zero representing no risk and one hundred representing maximum risk, as determined by analyzing the posture information 316. The local risk engine 264 is then configured to issue a silent alarm trigger 324 when the local risk engine 264 computes a risk score that exceeds a predetermined threshold (e.g., seventy). Once triggered, the silent alarm bit 318 encodes the triggered silent alarm state. The triggered silent alarm state is then included in a sequence of auxiliary bits 310, which is embedded in a passcode 314 and transmitted to the server 120 when the user attempts to logon.

In some examples, the local risk engine 264 may disable the soft token 250 directly when a computed risk score exceeds a predetermined value, thereby preventing subsequent logins to the server 120. The predetermined value may be the same as that specified above for triggering the silent alarm 246, or it may be different. It is noted that disabling the soft token 250 prevents logins for both paths 322a and 322b.

As also shown in FIG. 3, an inquiry scheduler 262 is provided for controlling the scheduling and execution of the inquiry procedures 266. In some examples, the inquiry scheduler 262 includes a database that stores a listing of IDs of inquiry procedures 266 with associated indications of when the inquiry procedures 266 are to be run. The database specifies that some of the inquiry procedures 266 are to be run periodically, on one or more set schedules, whereas other inquiry procedures 266 are to be run in response to particular events. Event sensors 270 collect events from diverse locations of the device 112 and alert the inquiry scheduler 262 when the events occur. In response to being alerted by the event sensors 270 that an event has occurred, the inquiry scheduler 252 executes one or more of the inquiry procedures 266 that are associated with the respective event in its database. In some examples, the events sensed by the event sensors 270 include a startup event from the soft token 250, which indicates that the soft token has been started on the device 112. The inquiry sensor 262 may direct the execution of certain of the inquiry procedures 266 in response to the soft token 250 starting, e.g., to ensure that the device 112 can be safely used for logins.

In some examples, the inquiry scheduler 262 lists IDs of inquiry procedures 266 in connection with scheduling information. When an inquiry procedure is to be run, the inquiry scheduler 262 reads the manifest 260 to find the location of the respective inquiry procedure as indicated by the ID and directs the procedure at that location to be executed. Resulting posture information 316 is stored in the collector 242 and in the posture history 268.

It is understood that, in some examples, the inquiry procedures 266 have access both to current posture information 316 and past posture information 316 (e.g., via the collector 242 and history 268). Therefore, the functions of the inquiry procedures can include comparing currently collected data pertaining to some aspect of the mobile device 112 with previously collected information, to detect changes that could signify malicious activity. In some examples, some of the inquiry procedures 266 are arranged hierarchically, with certain inquiry procedures both producing their own results and feeding their results to other inquiry procedures for consideration in determining results of the other inquiry procedures.

It is further understood that inquiry procedures 266 may be added, deleted, or modified over time, to reflect a desire to obtain different posture information 316 from the device 112 as time passes and requirements change. To this end, the feedback processor 254 may receive information from the server 120, or from some other server, to perform updates on the inquiry procedures 266. In some examples, updates also involve modifying the manifest 260, the database stored in the inquiry scheduler 262, the risk engine 264, and/or the event sensors 270. The feedback processor 254 may also receive communications from the server 120 for scheduling transmission of posture information 316 via the auxiliary bit scheduler 252. A more detailed description of silent alarm operation will now be presented with reference to FIG. 4.

Figure 4:
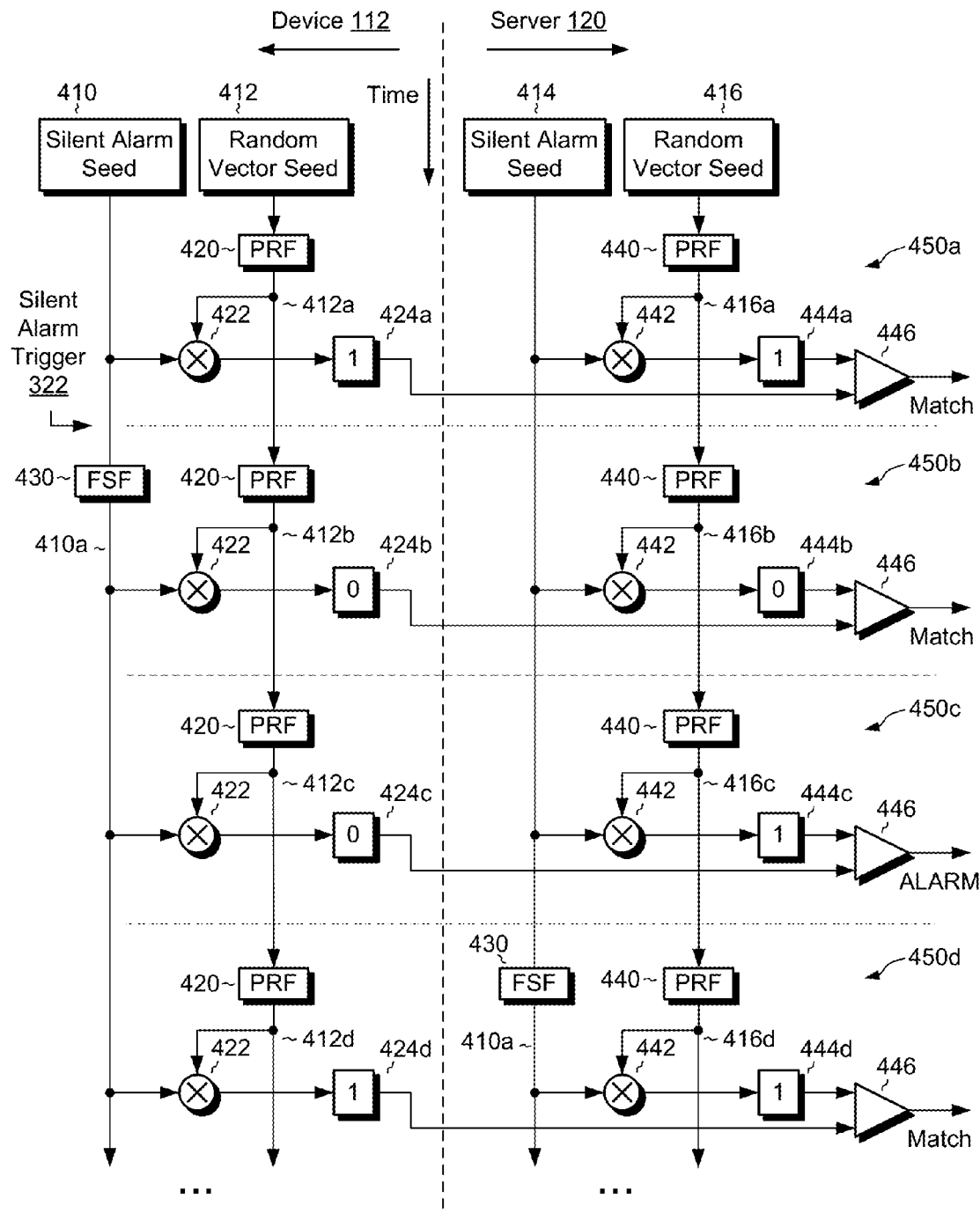
FIG. 4 is a diagram showing example generation of a silent alarm on the device of FIG. 2 and the server of FIG. 1, as well as testing of silent alarms on the server to detect mismatches from expected values.

FIG. 4 shows a simplified example of silent alarm operation. As indicated in connection with FIG. 3, the scheduler 252 may include one or more silent alarm bits (e.g., one bit) to indicate whether the mobile device 112 has been tampered with or otherwise subjected to malicious activity.

The silent alarm bit appears to vary randomly. Yet, it follows a specific pattern that allows the device 112 silently to communicate suspect activity to the server 120. If the silent alarm is triggered, the server 120 detects the triggered state and responds. The response of the server 120 may include disabling the soft token on the device 112, refusing to accept future login attempts from the device 112, or other measures. Because the silent alarm bit is one of the auxiliary bits 310 included in passcodes 314 received from the device 112, the silent alarm is bound to the other associated auxiliary bits 310 and can therefore be used directly as an indicator of trust in those other auxiliary bits. Therefore, the server 120 may use the silent alarm in determining whether to trust the data that it receives on other auxiliary bits 310 provided along with the silent alarm. Also, the server 120 may permanently distrust auxiliary bits 310 from a device 112 whose silent alarm has been triggered. In some examples, the server 120 may continue to allow logins from users whose passcodes 314 indicate triggered silent alarms, while closely monitoring them, to collect data on the behavior of such users.

As shown in FIG. 4, activities are conducted in parallel on the device 112 and on the server 120. The device 112 and the server 120 are both provisioned with a silent alarm seed 410/414 and a random vector seed 412/416. The silent alarm seeds 410 and 414 are identical, i.e., they are synchronized between the device 112 and the server 120. The random vector seeds 412 and 416 are also synchronized. In one example, the silent alarm seed 410/414 and random vector seed 412/416 are each 64-bit values. Although the random vector seed 412/416 may be publicly known, the silent alarm seed 410/414 is generally retained as a secret.

Operation will now be described with reference to different time frames 450a-450d. Each timeframe 450a-450d represents an interval of time during which respective passcodes 314 are generated by the device 112. For simplicity, it is shown that each passcode 314 created is sent to the server 120. Those skilled in the art will recognize, however, that the server 120 will typically not receive each passcode 314 generated, but rather can remain synchronized with the device 112 by "fast-forwarding" through different timeframes 450a-450d, employing jump tables, or using other known techniques.

For each passcode 314 produced by the device 112, the silent alarm value (initially, the silent alarm seed 410) is sampled. As shown in timeframe 450a, sampling is initiated by subjecting the random vector seed 412 to a pseudo-random function (PRF) 420 to generate a pseudo-random signal 412a. An inner product multiplier 422 then calculates the modulo-2 of the inner product of the pseudo-random signal 412a and the silent alarm value 410. The result of the inner product is a single silent alarm bit 424a. The sequencer 252 may include this bit 424a as one of the auxiliary bits 310, which is combined with a token code 312 to form a passcode 314 (see FIG. 3).

If the passcode 314 is used as part of a login attempt (as assumed in this example), the passcode 314 is transmitted to the server 120, where the auxiliary bits are extracted, including the silent alarm bit 424a.

A parallel process takes place at the server 120. A random vector seed 416 is subjected to a pseudo-random function (PRF) 440 to generate a pseudo-random signal 416a. The pseudo-random function 440 is identical to the pseudo-random function 420. An inner product multiplier 442 calculates the modulo-2 of the inner product of the pseudo-random signal 416a and the silent alarm value 414. The result of the inner product is a predicted silent alarm bit 444a. The server 120 then compares (e.g., using comparator 446) the predicted silent alarm bit 444a with the actual silent alarm bit 424a that it received via the passcode 314. Since the same operations are performed on the same starting values, the two bits 424a and 444a are identical, i.e., there is a match.

The activities of timeframe 450a can repeat as described above. Owing to the pseudo-random function 420, different parts of the silent alarm seed 410 will be sampled and transmitted to the server 120. Without a silent alarm trigger, different silent alarm bits will continue to match between the device 112 and the server 120.

At some point, however, a silent alarm trigger 460 may occur. This trigger may occur in response to a detection of tampering or malware on the device 112, for example. As shown in timeframe 450b, the mobile device 112 increments the state of the silent alarm upon detection of the trigger by subjecting the current silent alarm value to a forward secure function (FSF) 430. The forward secure function 430 is a one-way function, such as FS_PRNG, which cannot be reversed. The forward secure function 430 generates a new silent alarm value 410a, which is then used as input to the inner product multiplier 422.

On successive login attempts, silent alarm bits 424b, 424c, and 424d are created, which represent samples of the new silent alarm value 410a. These bits may match expected values on the server 120 by accident, as they do in timeframe 450b (since there is a 50% probability of a match even when samples are taken of different silent alarm values). The probability of continued matches decreases exponentially on successive logins, however, and, eventually, as shown in timeframe 450c, a mismatch is detected.

The mismatch alerts the server 120 that the silent alarm on the device 112 has been triggered and, therefore, that the server should not trust any of the auxiliary bits received with the mismatching silent alarm. The server may also register that auxiliary bits obtained during immediately prior login attempts (e.g., during the timeframe 450b) are also not to be trusted, since there is a reasonable probability that the silent alarm was triggered before the auxiliary bits for those logins were received, as well.

Once the server 120 detects the mismatch, it increments its local silent alarm value (e.g., during timeframe 450d) by subjecting its local silent alarm value to the same forward secure function 430 as was used during timeframe 450b on the device 112. The silent alarm values between the device 112 and the server 120 will then once again be in sync, and sampled silent alarm bits will continue to match until another silent alarm trigger, like the silent alarm trigger 460, occurs. Further activity may be required, however, before the server 120 trusts any auxiliary bits 310 received from the device 112, as it may remain to be determined whether or not the event that caused the silent alarm trigger 460 indicates an ongoing security breach.

Figure 5:
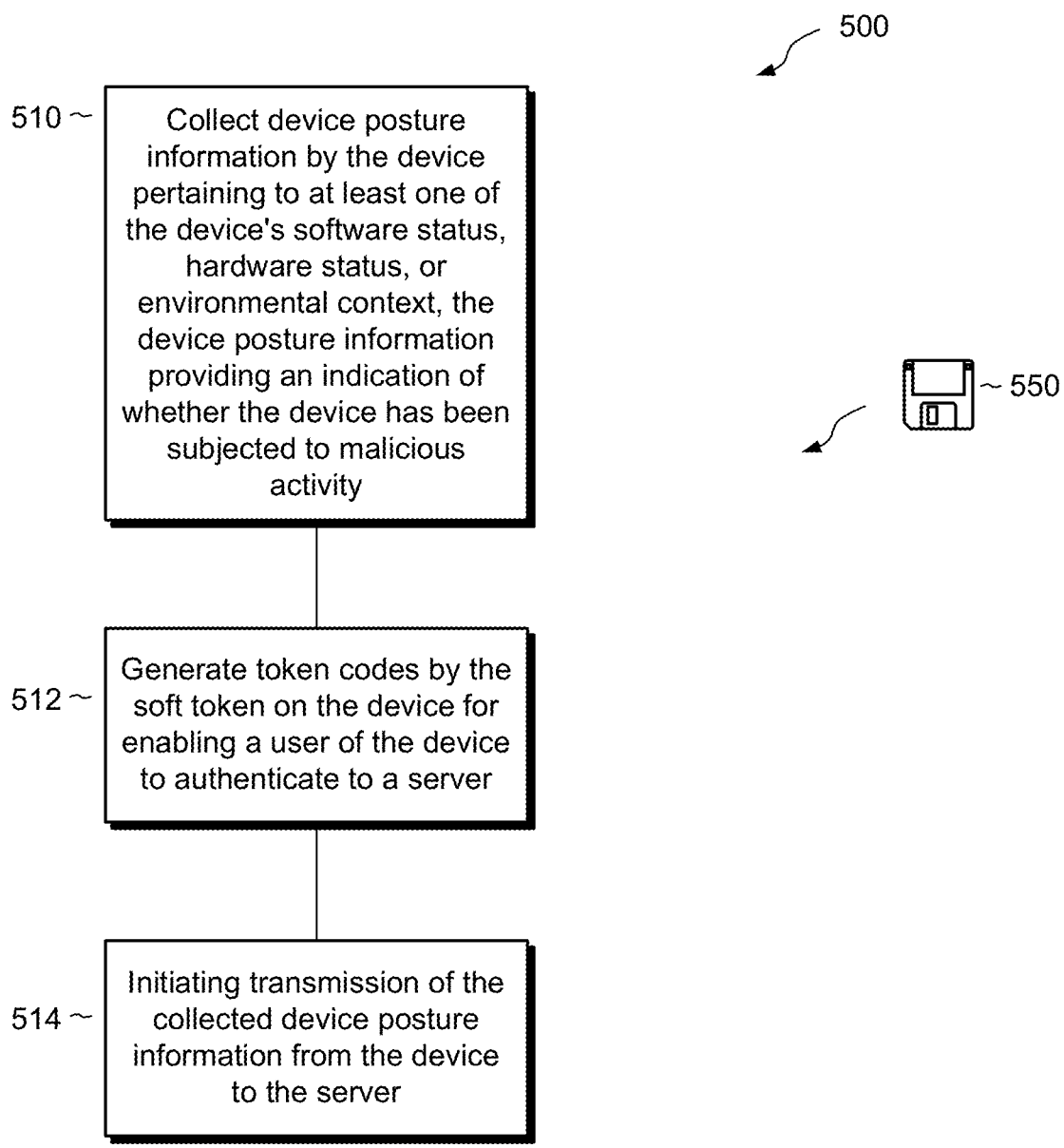
FIG. 5 is a flowchart showing an example process for collecting and initiating transmission of device posture information to the server.

FIG. 5 shows an example process 500 for assessing the security status of a device on which a soft token is run. The process 500 is typically performed by the software constructs described in connection with FIGS. 2 and 3, which reside in the memory 240 of the device 112 and are run by the set of processors 230. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

At step 510, posture information 316 is collected by the device 112. The device posture information 316 pertains to at least one of the device's software status, hardware status, or environmental context, and provides an indication of whether the device 112 has been subjected to malicious activity. For example, the posture information 316 is collected by the collector 242 following execution of the inquiry procedures 266, which are identified in the manifest 260 and scheduled to be run by the inquiry scheduler 262.

At step 512, token codes 312 are generated by the soft token 250 on the device 112 for enabling a user 110 of the device 112 to authenticate to a server 120. For example, the soft token 250 generates token codes 312, which are displayed, either unaltered or embedded with auxiliary bits 310 to form passcodes 314, in the passcode image 212 of the display 210 of the device 112.

At step 514, transmission of the collected device posture information 316 is initiated from the device 112 to the server 120. For example, where the path 322a is selected, device posture information 316 is initiated by providing the device posture information to the network interface 222 of the device 112. Transmission may continue with the network interface 222 sending the device posture information 316 over the network 118 to the server 120. Transmission of device posture information 316 may also be initiated by providing the data to some other interface, such as a Blue-tooth or infrared interface, for example, for sending the device posture information 316 to the server 120. Where the path 322b is selected, transmission of the collected device posture information 316 is initiated by dividing the device posture information 316 into different sequences of auxiliary bits 310 and combining, via the embedder 256, the sequences of auxiliary bits 310 with respective token codes 312 to create passcodes 314. Passcodes 314 are then displayed in the passcode image 212 of the display 210 of the device 112. Transmission may then be continued by the user 110 manually transferring the passcodes 314 to a login screen on a computing machine 114 and submitting the passcodes 314 to the server 120 as parts of authentication requests.

An improved technique has been described for collecting device posture information 316 from a device 112 running a soft token 250 and initiating transmission of the device posture information 316 to a server 120 to be used in assessing whether the device 112 has been subjected to malicious activity. The device posture information 316 may relate to the software status, hardware status, and/or environmental context of the device 112. The server 120 may apply the device posture information 316 in a number of areas, including, for example, authentication management, risk assessment, and/or security analytics.

In the embodiments shown, device posture information 316 is acquired through the use of inquiry procedures 266. A wide variety of inquiry procedures 266 may be provided, which relate to various aspects of the hardware, software, and/or environment of the device 112. What follows are examples of particular inquiry procedures 266. It is understood that these examples are presented in an open-ended fashion. Over time, it is understood that various inquiry procedures 266 may be added, deleted, or modified. Therefore, the following list of inquiry procedures 266 should be understood as merely illustrative.

In one example inquiry procedure 266a, the execution environment of the device 112 is monitored to detect whether any application is running on the device 112, which has not been authorized by the manufacturer of the device 112. Manufactures of certain smart phones and other devices require applications to be tested and vetted before the applications are authorized for use on their devices. The inquiry procedure 266a checks for unauthorized applications or other software constructs and provides posture information 316 that indicates results of such checks, e.g., whether any applications are unauthorized. For example, applications for the iPhone and iPad from Apple, Inc. require all applications to be tested and distributed from a single source. Sophisticated users may circumvent Apple's restrictions through a process called "jailbreaking." In some examples, the inquiry procedure 266a detects whether the device 112 has been jailbroken and sets the device posture information 316 accordingly. Information about whether the device 112 has been jailbroken may be used by the local risk engine 264, as well as by the server 120, in assessing whether the device is safe for use in logging on to the server 120. In some examples, users of jailbroken devices may be granted limited access rights by the server 120. As is known, the jailbreaking operation can be reversed, such that a device that has been jailbroken can again be rendered compliant. Therefore, the inquiry procedure 266a may be repeated, for example, on a regular basis or each time the user 110 starts the soft token 250, to regularly update posture information 316 related to the jailbroken status of the device 112.

In another example inquiry procedure 266b, the storage location of the soft token 250 on the device 112 is inspected to determine the last date and time that the storage location was accessed. The inquiry procedure 266b then compares this date and time with the last date and time the soft token 250 was run. Typically, the two dates and times should be consistent or match a consistent behavior, and any inconsistency or mismatch may suggest that the soft token has been subjected to tampering. The inquiry procedure 266b may provide matching information in the posture information 316. In some examples, the inquiry procedure 266b is programmed to recognize certain normal access to the storage location of the soft token 250, such as upgrades, for example. The inquiry procedure 266b is then programmed to take this normal access into consideration when reporting posture information 316. In addition, the inquiry procedure 266b may indicate any updates to the soft token code in the posture information 316, which the server 120 may use as a collection metric.

In another example inquiry procedure 266c, signature checks of software components running on the device 112 are inspected to determine whether they pass or fail. The signature checks may include both signature checks of non-volatile component files and in-memory signature checks of the components after they have been loaded into memory. Failures of signature checks may indicate that the software component has been modified (e.g., by a malicious user). The inquiry procedure 266c may provide results of signature checks in the posture information 316. The inquiry procedure 266c, or another inquiry procedure, also checks a hash of the code of the soft token 250. Any change in the hash could indicate that the soft token 250 has been modified. Changes in the hash of the soft token 250 may be reported in the posture information 316.

In another example inquiry procedure 266d, one or more tests are run to determine whether the code of the soft token 250 is being run in a debugger, which may indicate malicious activity. The inquiry procedure 266d may detect whether the soft token 250 is being run in a debugger by timing the execution of code of the soft token code 250 and comparing the speed of code execution during different runs of the inquiry procedure 266d. Any change in execution time may indicate that the soft token 250 is being run in a debugger. Results of the inquiry procedure 266d may be provided in the posture information 316. The inquiry procedure 266d, or another inquiry procedure, can also employ the timing procedure described above to determine whether the soft token 250 has been moved to different hardware, as any increase or decrease in execution speed may indicate movement of the soft token 250 to a different system. The posture information 316 is updated to reflect such findings.

In another example inquiry procedure 266e, a check is performed to determine whether more than one soft token 250 is installed on the device 112. Although duplicate tokens are not necessarily malicious, their presence is suspect and therefore may contribute to an overall risk assessment associated with logging on the user 110 of the device 112 to the server 120. Duplicate token information is provided in the posture information 316.

In another example inquiry procedure 266f, a check is performed to determine whether the clock 244 on the device 112 indicates a change in time. Changes in time may suggest manipulation by a fraudster. To verify that time changes are not associated with normal activities, such as travel, the inquiry procedure 266f preferably also checks geolocation information, e.g., from a GPS installed on the device 112. If time changes cannot be accounted for by changes in GPS location, a suspect time change may be indicated in the posture information 316.

In another example inquiry procedure 266g, a check is performed to determine whether a virtual machine on which the soft token 250 is running has been copied or moved to another system. In some examples, the soft token 250 is not installed on the device 112 but is rather installed on a virtual machine to which the device 112 or the computing machine 114 has access. In these examples, the fact that the soft token 250 has been copied or moved can be detected by timing the code (or portions thereof), or checking the cache of the virtual machine for consistency. Changes in the speed of execution of the soft token 250 or in the cache can indicate that the soft token 250 is being run on a different physical machine, and such detected changes are reported in the posture information 316.

In another example inquiry procedure 266h, physical hardware modules are detected. For example, the inquiry procedure 266h checks a trusted platform module (TPM) of the device 112 and instructs the TPM the sign its platform configuration registers (PCRs). Results of signature checks are reported in the posture information 316. In some examples, third party products are employed by the inquiry procedure 266h, or other inquiry procedures, for detecting peripherals. For instance, the S-box performs a handshake with every peripheral of the device 112. Any changes over time as reported by the S-box platform are provided in the posture information 316.

In another example inquiry procedure 266i, one or more hardware peripherals are checked to identify the last time the respective hardware peripheral was accessed and for how long the respective hardware peripheral was accessed. Changes from previous peripheral access times and/or durations of use may indicate malicious activity. Results of peripheral usage checks are provided in the posture information 316.

In another example inquiry procedure 266j, an inquiry is made as to whether any new partner plugins have been introduced to the device 112. As new plugins may carry malicious code, information about any such plugins is provided in the posture information 316.

In yet another example inquiry procedure 266k, device binding information is verified. For example, the inquiry procedure 266k may check device state information, such as MAC address, serial numbers of various components, and settings of any device fingerprinting modules. The binding information is compared with previously stored values of the binding information, and any changes are reported in the posture information 316.

In still another example inquiry procedure 266l, device geolocation is checked. For example, a GPS on the device 112 may be checked to determine whether the device 112 is being used from a particular location. Also, the device 112 may check Wi-Fi signals within its range to determine whether a certain Wi-Fi beacon is detected. Results of these checks are provided as posture information. Geolocation may be used locally by the device 112 or at the server 120 to limit access of users to particular geographic locations, or to limit access to users who are within range of a particular Wi-Fi beacon.

In a still further inquiry procedure 266m, a signal topography is detected of electromagnetic signals in the neighborhood of the device 112. The signal topography can include Wi-Fi, Bluetooth, cellular frequencies, local RFID signals, and near field communication (NFC) signals, for examples. These signals provide landmarks of an electronic neighborhood of the device 112. The inquiry procedure 266m stores various details of the signal topography of its electronic neighborhood, and then looks for similar details on subsequent executions. Differences in signal topology, or the topology itself, as measured by the device 112, are reported as posture information 316.

The preceding are merely several examples of inquiry procedures 266 that may be implemented with the device 112. It is understood that none of the particular inquiry procedures 266a-266m are required. Rather, these are provided as examples only.

If the device 112 containing the soft token 250, together with collected posture information about any of the user 110, the user's environment, trusted environments, and information about user's hardware, software, and/or biometrics is stolen, then both the user's privacy and the security of the network may be compromised. In order to prevent information leakage, any of the foregoing inquiry procedures 266a-m, may, as appropriate, store its posture information in encrypted or obfuscated form. In some examples, any encryption applied (e.g., encryption keys) are shared with the server 120, which can decode the encrypted device posture information once it is received. In other examples, inquiry procedures 266a-m store posture information in the form of fuzzy commitments. As is known, fuzzy commitments are extracts of data of interest, possibly combined with other information, which are unreadable to attackers. But the device 112 can still accurately test newly acquired data (i.e., based on new posture information 316 of the same type as before) against previously computed fuzzy commitments, to determine whether the underlying information has changed. The device 112 may then convey test results to the server 120. In a variant on this idea, a fuzzy commitment established by the device 112 based on collected posture information 316 can be transmitted to the server 120, which can then use the fuzzy commitment as a baseline for testing newly acquired fuzzy commitments later produced by the device 112 and conveyed to the server 120.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, it has been shown and described that inquiry procedures 266 are related to security. However, this is merely an example. Some inquiry procedures may be provided to transfer non-security related information to the server 120, such as revisions of software installed on the device 112, an inventory of hardware included on the device 112, and an inventory of peripherals accessed by the device 112. It is understood, therefore, that inquiry procedures 266 can perform a wide variety of functions and acquire a wide variety of information.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of assessing a security status of a device on which a soft token is run, comprising:
  collecting device posture information by the device pertaining to at least one of the device's software status hardware status or environmental context, the device posture information providing an indication of whether the device has been subjected to malicious activity;
  generating token codes by the soft token on the device for enabling a user of the device to authenticate to a server; and
  initiating transmission of the collected device posture information from the device to the server,
  wherein collectin device posture information includes running multiple inquiry procedures on the device, receiving respective responses to the inquiry procedures, and storing the responses to the inquiry procedures for transmission to the server, and
  wherein initiating transmission of the collected device posture information from the device to the server includes:
    assigning different portions of the device posture information to multiple sequences of auxiliary bits;
    blending different sequences of auxiliary bits with respective token codes from the soft token on the device to generate respective passcodes; and
    displaying the passcodes to the user for manual transfer by the user to a computing machine connected to the server over a network.

2. The method of claim 1, further comprising maintaining a schedule of inquiry procedures to be run, wherein the schedule includes inquiry procedures that are run periodically and inquiry procedures that are run in response to particular events.

3. The method of claim 1, further comprising configuring at least one bit of the auxiliary bits of a sequence of auxiliary bits as a silent alarm, the silent alarm indicating whether the device has been subjected to malicious activity.

4. The method of claim 3, further comprising:
  generating the silent alarm on the device from an initial multi-bit silent alarm seed shared between the soft token and the server; and
  alerting the server whether to treat the auxiliary bits of the sequence of auxiliary bits in which the silent alarm is included as trusted or untrusted based on whether the silent alarm is triggered.

5. The method of claim 4, further comprising assessing a level of risk associated with collected device posture information and triggering the silent alarm if the level of risk exceeds a predetermined threshold, wherein triggering the silent alarm includes subjecting the silent alarm to a forward-secure function shared between the soft token and the server.

6. The method of claim 1, further comprising assessing a level of risk associated with the collected device posture information and disabling the soft token when the level of risk exceeds a predetermined threshold.

7. The method of claim 1, wherein the inquiry procedures include at least one of:
  (i) testing whether the soft token has been upgraded;
  (ii) detecting a presence of hardware modules installed on the device and whether any changes have been made in a configuration of any of the hardware modules; and
  (iii) checking identifying hardware information on the device, including at least one of a MAC address, serial number, and device fingerprinting module of the device, and comparing the checked hardware information with a record of previously obtained hardware information of the device.

8. The method of claim 3, wherein the inquiry procedures include at least one of:
  (i) identifying whether the soft token is being run in a debugger; and
  (ii) measuring a speed of operation of the soft token and comparing the speed of operation of the soft token with at least one previously measured speed of operation of the soft token to determine whether the speed of operation of the soft token has substantially changed.

9. The method of claim 3, wherein the inquiry procedures include testing whether the device is within Wi-Fi range of a predetermined Wi-Fi beacon, and disabling the soft token on the device if the device is not within range of the predetermined Wi-Fi beacon.

10. The method of claim 3, wherein the inquiry procedures include detecting an electronic topography of wireless devices in a vicinity of the device, and comparing the electronic topography to at least one previously detected electronic topography in the vicinity of the device to indicate whether the device is being used in an environment in which it has previously been used.

11. The method of claim 1, wherein the inquiry procedures include at least one of:
(i) monitoring an execution environment of the device to detect whether applications unauthorized by a manufacturer of the device are running; and
(ii) testing whether the device has been jailbroken.

12. The method of claim 1, wherein the inquiry procedures include at least one of:
(i) comparing a last time that a storage location in which the soft token is stored on the device was accessed with a last time that soft token was run;
(ii) checking a hash of the soft token code and comparing the hash with at least one previous hash of the soft token code to determine whether the hash of the soft token code has changed; and
(iii) testing whether more than one copy of a soft token is installed on the device.

13. The method of claim 1, wherein the inquiry procedures include at least one of:
(i) testing whether a software component on the device fails signature checks or in-memory signature checks; and
(ii) testing whether a new partner plug-in has been installed on the device.

14. The method of claim 1, wherein the inquiry procedures include testing whether a change in device time has taken place.

15. The method of claim 1, wherein the inquiry procedures include at least one of:
(i) checking a last time a hardware peripheral of the device was accessed; and
(ii) checking for how long the hardware peripheral was accessed the last time the hardware peripheral was accessed.

16. The method of claim 1, wherein the device is configured as a virtual machine, and wherein the inquiry procedures include testing whether the soft token has been copied or moved to a different device.

17. The method of claim 1, further comprising obfuscating a set of the collected device posture information by rendering the set of collected device posture information in a form of a fuzzy commitment.

18. A device including a soft token for generating token codes for authenticating a user to a server, the device comprising:
a set of processors; and
memory, coupled to the set of processors, the memory constructed and arranged to store instructions executable by the set of processors,
wherein the set of processors executing instructions from the memory forms a specialized circuit constructed and arranged to:
collect device posture information by the device pertaining to at least one of the device's software status, hardware status, or environmental context, the device posture information providing an indication of whether the device has been subjected to malicious activity;
generate token codes by the soft token on the device for enabling the user of the device to authenticate to the server; and
initiate transmission of the collected device posture information from the device to the server,
wherein when constructed and arranged to initiate transmission of the collected device posture information from the device to the server, the specialized circuit is further constructed and arranged to:
assign different portions of the device posture information to multiple sequences of auxiliary bits;
blend different sequences of auxiliary bits with respective token codes from the soft token on the device to generate respective passcodes; and
display the passcodes to the user for manual transfer by the user to a computing machine connected to the server over a network.

19. A non-transitory computer readable medium including instructions which, when executed by a set of processors of a device, cause the set of processors to perform a method of assessing a security status of a device on which a soft token is run, the method comprising:
collecting device posture information by the device pertaining to at least one of the device's software status, hardware status, or environmental context, the device posture information providing an indication of whether the device has been subjected to malicious activity;
generating token codes by the soft token on the device for enabling a user of the device to authenticate to a server;
generating a set of passcodes that include a combination of token codes generated by the soft token on the device and device posture information collected by the device and
initiating transmission of the collected device posture information from the device to the server,
wherein initiating transmission of the collected device posture information from the device to the server includes:
assigning different portions of the device posture information to multiple sequences of auxiliary bits;
blending different sequences of auxiliary bits with respective token codes from the soft token on the device to generate respective passcodes; and
displaying the passcodes to the user for manual transfer by the user to a computing machine connected to the server over a network.

20. The non-transitory computer readable medium of claim 19, wherein the method further comprises: generating the silent alarm on the device from an initial multi-bit silent alarm seed shared between the soft token and the server; and alerting the server whether to treat the auxiliary bits of the sequence of auxiliary bits in which the silent alarm is included as trusted or untrusted based on whether the silent alarm is triggered.

* * * * *